(12) United States Patent  (10) Patent No.: US 8,847,459 B2
Baudey et al.  (45) Date of Patent: Sep. 30, 2014

(54) COIL FOR SLOTLESS ELECTRIC MOTORS HAVING COMPACT RADIAL HEADS

(75) Inventors: Julien Baudey, Ayze (FR); Cyril Baud, Les Fins (FR); Alexis Montagnat-Rentier, Saint Cassien (FR)

(73) Assignee: Portescap SA, La Chaux-de-Fonds (CH)

( * ) Notice: Subject to any disclaimer, the term of this patent is extended or adjusted under 35 U.S.C. 154(b) by 206 days.

(21) Appl. No.: 13/242,243

(22) Filed: Sep. 23, 2011

(65) Prior Publication Data

US 2012/0080975 A1   Apr. 5, 2012

(30) Foreign Application Priority Data

Sep. 30, 2010 (CH) ..................................... 1595/10

(51) Int. Cl.
- H02K 3/04  (2006.01)
- H02K 3/47  (2006.01)
- H01F 41/06 (2006.01)

(52) U.S. Cl.
CPC .............. H02K 3/47 (2013.01); H01F 41/0691 (2013.01); H01F 41/0654 (2013.01)
USPC ............................ 310/208; 310/260; 310/270

(58) Field of Classification Search
USPC ........................... 310/208, 200–207, 260, 270
IPC ........................................ H02K 3/04,3/47, 3/50
See application file for complete search history.

(56) References Cited

U.S. PATENT DOCUMENTS

| | | | |
|---|---|---|---|
| 5,304,884 A * | 4/1994 | Kitajima et al. | 310/208 |
| 5,525,850 A * | 6/1996 | Stinson | 310/194 |
| 7,671,504 B2 * | 3/2010 | Rohrer et al. | 310/208 |
| 8,053,946 B2 * | 11/2011 | Koizumi et al. | 310/266 |

* cited by examiner

*Primary Examiner* — Michael Andrews
(74) *Attorney, Agent, or Firm* — Honigman Miller Schwartz and Cohn LLP

(57) ABSTRACT

An axial self-supported coil for a slotless rotating electric motor. The axial self-supported coil includes one coil body formed by winded electrical conductors, with a head at each end, the electrical conductors in the coil body being substantially coplanar with the motor rotation axis, each coil head having an axial thickness, the axial self-supported coil having a conductor filling factor, characterized in that at least one of the electrical conductors is a multi-stranded conductor, in that a deformation arrangement of the multi-stranded conductor increases the conductor filling factor and in that a bending arrangement of the multi-stranded conductor reduces the axial thickness of each coil head.

20 Claims, 2 Drawing Sheets

COIL FOR SLOTLESS ELECTRIC MOTORS HAVING COMPACT RADIAL HEADS

CROSS REFERENCE TO RELATED APPLICATIONS

This U.S. patent application claims priority under 35 U.S.C. §119 to Swiss Patent Application No. 01595/10, filed on Sep. 30, 2010, which is hereby incorporated by reference in its entirety.

TECHNICAL FIELD

This disclosure relates to coils for electric motors and especially to axial coils for slotless motors.

BACKGROUND

Different ways to manufacture such coils are known. For example, U.S. Pat. No. 5,525,850A describes an axial coil for a slot-less motor. This coil is winded with electrical conductors parallel to the rotation axis, and in the two coil heads the wires are winded back after an angular displacement to provide a uniform interior diameter extending along the length of the stator for receiving the rotor of the motor. This coil presents the disadvantage of requiring a relatively long axial length for the heads. This has a negative impact on the total length of the motor and consequently increases the weight and the costs of the material needed to manufacture the whole motor frame and the rotation axis. The performances of the motor are also consequently affected since increased mass reduces the acceleration possibilities. Another source of efficiency loss is the high electrical resistance of this coil, as it is required to have a higher length of electrical conductor so that the overall electromagnetic efficiency is affected. It may also be noticed that the electrical conductors used, even with an optimized winding process, will not occupy the whole space available and there will be free space between the winded wires. The conductor filling factor is the ratio of electrical conductor volume to the total volume of the coil. The use of such conductors leads to a poor conductor filling factor, which hinders the realization of a low-length and low-diameter motor.

Some attempts have been carried out to reduce volume of the coil heads. In particular, the document JP1252135A discloses coils with three different winding arrangements of the electrical conductors to reduce the volume of the coil heads. In two of the arrangements, the winding of the conductors is done with an angular displacement of the conductor in the coil body so as to reduce the size of the coil heads. However, such coil winding has the disadvantage of reducing the torque and power factors of the motor, as the electrical conductors are not parallel to the rotation axis, but rather extend at a significant angle to the rotation axis, resulting in a reduction of the efficiency of the electromagnetic forces.

SUMMARY

The present disclosure provides an axial coil for a slotless motor, which is compact and does not negatively affect the optimum torque and power factors of the motor.

One aspect of the disclosure provides an axial self-supported coil for a slotless rotating electric motor. The axial self-supported coil includes one coil body formed by winded electrical conductors with a head at each end. The electrical conductors in the coil body are substantially coplanar with the motor rotation axis. Moreover, each coil head has an axial thickness. The axial self-supported coil has a conductor filling factor, wherein at least one of the electrical conductors is a multi-stranded conductor, in that a deformation arrangement of the multi-stranded conductor increases the conductor filling factor and in that a bending arrangement of the multi-stranded conductor reduces the axial thickness (At) of each coil head. Such a coil, with the axial length of the heads reduced, permits compact motors to be obtained, so that a significant cost reduction of the required material is achieved. In general, the heads of the coil do not contribute to the performance of the motor; however, their volume may be reduced so as minimize their negative impact on the axial length of the motor. Moreover, due to the use of multi-stranded conductors, it is possible to obtain a coil which is more compact due to an improved filling factor. It should be noted that in such coils, the electrical conductors are not parallel to the rotation axis, but rather extend in a helical pattern (e.g., at an angle of 20-30°) with respect to the longitudinal axis of the motor and extending along the length of the motor, as a result of the winding and post-forming process requirements of the motor. The angle of this helical pattern of the conductors relative to the rotational axis, however, is not so large as to result in any significant reduction of the torque and power factors of the motor.

The multi-stranded conductor may have individual strands with a maximum distance to the neutral axis. The bending arrangement of the multi-stranded conductors may be obtained by the maximum distance to the neutral axis of each strand of the multi-strand conductor. The multi-stranded wire has an equivalent electrical section compared to a mono-strand conductor, but the individual strands have from their lower diameter compared to the mono-strand conductor the ability to be bended with an arrangement to achieve this reduction in axial length without rupture or cracks within their material.

The multi-stranded conductors may have a cross section, and the deformation arrangement of the multi-stranded conductors is obtained by the deformation of the cross section of the multi-stranded conductors. The multi-strand conductor can be chosen to have a section able to be deformed so that such increased filling factor is obtained.

In some implementations, the coil body has a thickness (e), the electric motor has a number of poles 2n, and the axial thickness (At) of each coil head extending outwardly respects the condition $At<3e/n$. In some examples, the coil body has a thickness (e), the electric motor has a number of poles 2n, and the axial thickness (At) of each coil head extending outwardly respects the condition $At<2.4e/n$. In additional examples, the coil body has a thickness (e) and the electric motor has a number of poles 2n, and the axial thickness (At) of each coil head extending inwardly respects the condition $At<3e/n$. In yet additional examples, the coil body has a thickness (e) and the electric motor has a number of poles 2n, and the axial thickness (At) of each coil head extending inwardly respects the condition $At<2e/n$.

The at least multi-stranded conductor has an equivalent diameter and the coil heads are joining the coil body with a fillet radius smaller than four times the equivalent diameter. This implementation reduces the axial length of the motor, as less space is required between the head and the iron stator. The equivalent diameter is defined in relation to the diameter of the mono-stranded conductor that has the same electrical section than the multi-stranded conductor.

In some implementations, the axial self-supported coil has axial outputs of phase connection wires located on one external face of one head, between internal diameter (ID) and external diameter (OD) of the head, characterized in that all the axial outputs of phase connection wires are radially located so that they have at least one electrical conductor winded between each output and the internal diameter or the external diameter of the coil end head. Such implementations avoid known failures of electric motors where a phase connection wire is located close to the rotor detaching from the coil and thus touching the rotor, leading to a rupture of the cable and causing the breakage of the motor. Since all the connecting wires are located away from the internal diameter at their output, the risk of detaching one of those connecting cables from the coil is minimized, as they are maintained in place by a conductor from the coil.

Another aspect of the disclosure provides a method for manufacturing an axial self-supported coil for a slotless rotating electric motor. The method includes:

(i) winding electrical conductors with at least one multi-strand conductor to obtain a coil body, wherein the electrical conductors are substantially coplanar to the rotation axis, and two heads at each end, (ii) forming the body of the axial self-supported coil in a cylindrical shape with a deformation arrangement of the multi-strand conductor so that conductor filling factor is increased, and (iii) forming the heads with a bending arrangement of the multi-strand conductor, so that axial thickness (At) of the heads is reduced and so that conductor filling factor is increased.

The multi-strand conductor may include individual strands with a maximum distance to the neutral axis. The bending arrangement of the multi-strand conductor at step (iii) of forming the heads is obtained by the maximum distance to the neutral axis of each strand of the multi-strand conductor. The multi-stranded wire has an equivalent electrical section compared to a mono-strand conductor, but the individual strands have from their lower diameter compared to the mono-strand conductor the ability to be bended with an arrangement to achieve this reduction in axial length without rupture or cracks within their material.

In some examples, the coil body has a thickness (e) and the electric motor has a number of poles 2n, characterized in that the bending arrangement formed at the step (iii) of forming the heads results in each head extending outwardly having an axial thickness (At) that respects the condition At<3e/n. In additional examples, the coil body has a thickness (e) and the electric motor has a number of poles 2n, characterized in that the bending arrangement formed at the step (iii) of forming the heads results in each head extending outwardly having an axial thickness (At) that respects the condition At<2.4e/n. In further examples, the coil body has a thickness (e) and the electric motor has a number of poles 2n, characterized in that the bending arrangement formed at the step (iii) of forming the heads results in each head extending inwardly having an axial thickness (At) that respects the condition At<3e/n. The coil body, in some examples, has a thickness (e) and the electric motor has a number of poles 2n, characterized in that the bending arrangement formed at the step (iii) of forming the heads results in each head extending inwardly having an axial thickness (At) that respects the condition At<2e/n.

In yet another aspect, a slotless electric motor includes at least one coil according to the first aspect of the disclosure or manufactured with a process according to the second aspect of the disclosure. The an axial coil for a slotless motor may be compact and does not negatively affect the optimum torque and power factors of the motor.

In some implementations, an axial self-supported coil for a slotless rotating electric motor includes one coil body formed by winded electrical conductors, with a head at each end. The electrical conductors in the coil body may be substantially coplanar with the motor rotation axis. Each coil head has an axial thickness. The axial self-supported coil has a conductor filling factor, wherein at least one of the electrical conductors is a multi-stranded conductor, in that a deformation arrangement of the multi-stranded conductor increases the conductor filling factor and in that a bending arrangement of the multi-stranded conductor reduces the axial thickness (At) of each coil head. Such a coil, with the axial length of the heads reduced, permits compact motors to be obtained, so that a significant cost reduction of the required material is achieved. In general, the heads of the coil do not contribute to the performance of the motor; however, their volume may be reduced so as minimize their negative impact on the axial length of the motor. Moreover, due to the use of multi-stranded conductors, it is possible to obtain a coil which is more compact due to an improved filling factor. The electrical conductors may not be perfectly coplanar to the rotation axis, as process requirements from winding or post-forming of the coil, may induce orientations of the conductors with the rotation axis of 20-30° within the coil body, but these conductors are still considered coplanar to the rotation axis.

In some examples, the multi-stranded conductor has individual strands with a maximum distance to the neutral axis, and the bending arrangement of the multi-stranded conductors is obtained by the maximum distance to the neutral axis of each strand of the multi-strand conductor. The multi-stranded wire has an equivalent electrical section compared to a mono-strand conductor, but the individual strands have from their lower diameter compared to the mono-strand conductor the ability to be bended with an arrangement to achieve this reduction in axial length without rupture or cracks within their material.

The multi-stranded conductors may have a cross section, and the deformation arrangement of the multi-stranded conductors is obtained by the deformation of the cross section of the multi-stranded conductors. The multi-strand conductor is chosen to have a section able to be deformed so that such increased filling factor is obtained.

In some examples, the coil body has a thickness (e), the electric motor has a number of poles 2n, and the axial thickness (At) of each coil head extending outwardly respects the condition At<3e/n. In additional examples, the coil body has a thickness (e), the electric motor has a number of poles 2n, and the axial thickness (At) of each coil head extending outwardly respects the condition At<2.4e/n. In yet further examples, the coil body has a thickness (e) and the electric motor has a number of poles 2n, and the axial thickness (At) of each coil head extending inwardly respects the condition At<3e/n. Additionally, the coil body may have a thickness (e) and the electric motor may have a number of poles 2n, and the axial thickness (At) of each coil head extending inwardly respects the condition At<2e/n.

In some implementations, the at least multi-stranded conductor has an equivalent diameter and the coil heads are joining the coil body with a fillet radius smaller than four times the equivalent diameter. Such implementations may reduce the axial length of the motor, as less space is required between the head and the iron stator. The equivalent diameter is defined in relation to the diameter of the mono-stranded conductor that has the same electrical section than the multi-stranded conductor.

The axial self-supported coil may have axial outputs of phase connection wires located on one external face of one head, between internal diameter (ID) and external diameter (OD) of the head, such that all the axial outputs of phase connection wires are radially located so that they have at least one electrical conductor winded between each output and the internal diameter or the external diameter of the coil end head. This implementation avoids known failures of electric motors where a phase connection wire is located close to the rotor detaching from the coil and thus touching the rotor, leading to a rupture of the cable and causing the breakage of the motor. Since all the connecting wires are located away from the internal diameter at their output, the risk of detaching one of those connecting cables from the coil is minimized, as they are maintained in place by a conductor from the coil.

Another aspect of the disclosure provides a method for manufacturing an axial self-supported coil for a slotless rotating electric motor. The method includes:

(i) winding electrical conductors with at least one multi-strand conductor to obtain a coil body, wherein the electrical conductors are substantially coplanar to the rotation axis, and two heads at each end, (ii) forming the body of the axial self-supported coil in a cylindrical shape with a deformation arrangement of the multi-strand conductor so that conductor filling factor is increased, and (iii) forming the heads with a bending arrangement of the multi-strand conductor, so that axial thickness (At) of the heads is reduced and so that conductor filling factor is increased.

The multi-strand conductor may include individual strands with a maximum distance to the neutral axis, and the bending arrangement of the multi-strand conductor at step (iii) of forming the heads is obtained by the maximum distance to the neutral axis of each strand of the multi-strand conductor. The multi-stranded wire has an equivalent electrical section compared to a mono-strand conductor, but the individual strands have from their lower diameter compared to the mono-strand conductor the ability to be bended with an arrangement to achieve this reduction in axial length without rupture or cracks within their material.

In some examples, the coil body has a thickness (e) and the electric motor has a number of poles 2n, characterized in that the bending arrangement formed at the step (iii) of forming the heads results in each head extending outwardly having an axial thickness (At) that respects the condition At<3e/n. In additional examples, the coil body has a thickness (e) and the electric motor has a number of poles 2n, characterized in that the bending arrangement formed at the step (iii) of forming the heads results in each head extending outwardly having an axial thickness (At) that respects the condition At<2.4e/n. In yet further examples, the coil body has a thickness (e) and the electric motor has a number of poles 2n, characterized in that the bending arrangement formed at the step (iii) of forming the heads results in each head extending inwardly having an axial thickness (At) that respects the condition At<3e/n. In some examples, the coil body has a thickness (e) and the electric motor has a number of poles 2n, characterized in that the bending arrangement formed at the step (iii) of forming the heads results in each head extending inwardly having an axial thickness (At) that respects the condition At<2e/n.

The disclosure also covers a slotless electric motor including at least one coil and methods of manufacturing the same.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
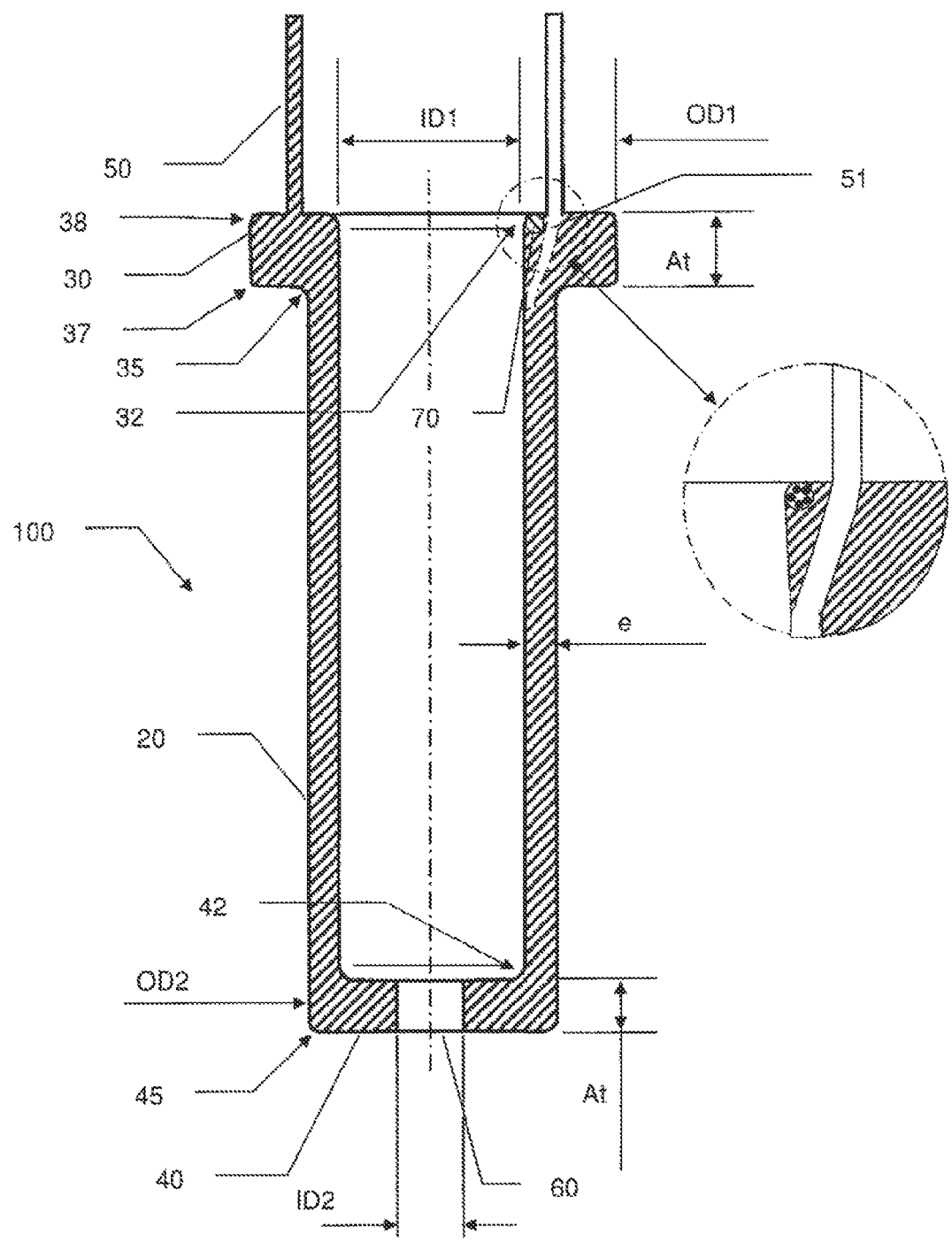
FIG. 1 is a sectional view of an exemplary 2-pole axial coil for a brushless motor, with a partial expanded section view of a connector of the coil.

A coil 100, as shown in FIG. 1, includes a coil body 20, and a head 30, 40 located at each end of the coil body 20. The coil body 20 is an elongated outer wall having a thickness (e) between an outer and an inner surface. The first head 30 extends outwardly from the outer surface of the coil body 20 and the second head 40 extends inwardly from the inner surface of the coil body 20, so that during the manufacturing of a motor intended to include the coil 100, a rotor of the motor (not represented) can be inserted inside the coil 100 through the head 30 and positioned as close as possible to the head 40 without abutting it. The longitudinal axis of the rotor can be centered in an opening 60 located in the head 40 by ball bearings or equivalent means. In some implementations, the wires at the end 40 of the motor are deformed radially inwardly toward a longitudinal axis 200 defined by the motor, but the loops of wire stop short of the longitudinal axis 200 and form the opening 60 of relatively small diameter and the end 40 of partially closed configuration.

The coil 100 is thus formed solely of the loops of conductor deformed into the desired cylindrical configuration with radially projecting heads at the ends thereof holding the cylindrical body in place. One of the heads, such as upper head 30 as depicted in the Figs., projects radially outwardly from the cylindrical body, while the other head, such as lower head 40, projects radially inwardly from the cylindrical body. The heads add strength and rigidity to the coil and to enable a rotor or shaft to be introduced into and then held within the coil. The coil 100 is thus formed to be free of any frame structure (or other such structural members) for supporting the loops of conductor in the desired coil configuration. This slotless construction allows the coil to present more loops of conductor (i.e., enables the coil to have a higher density of loops of conductor) and thus deliver more power for a given envelope of space than conventional coil construction having a frame structure that occupies part of the available space but does not contribute to the magnitude of the magnetic field generated by the coil.

Figure 2:
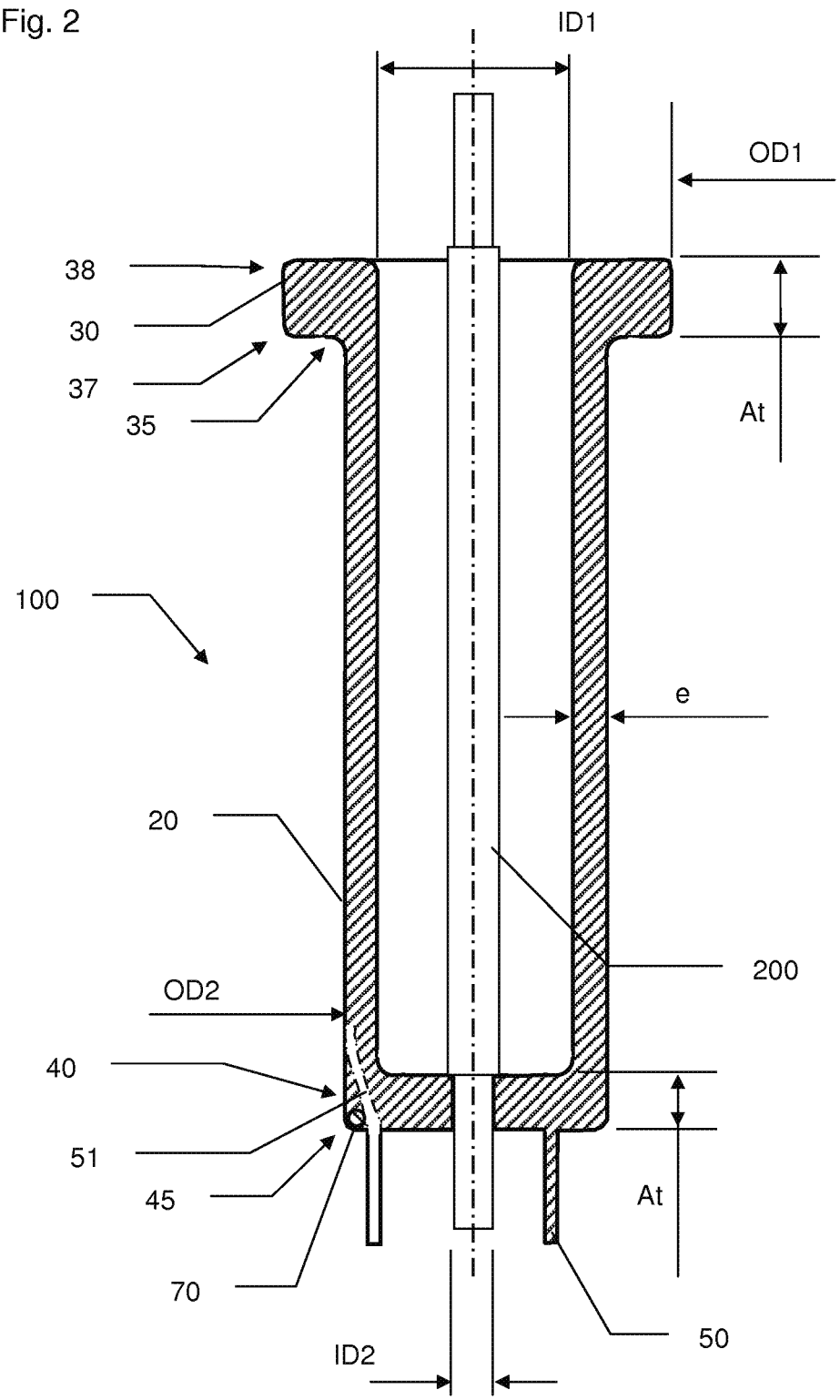
FIG. 2 is a sectional view of an exemplary 2-pole axial coil for a direct current motor.

Referring to FIG. 2, in some implementations, a rotor having a relatively large diameter portion comprising a permanent magnet or coil (not shown) and a relatively small diameter shaft projecting beyond the large diameter portion of the rotor for supporting the rotor for rotation may be installed in the coil 100. The large diameter portion of the rotor (shown at ID1) would be received in the open end 30 of the motor, with the small diameter shaft (shown at ID2) of the rotor extending through opening 60 and projecting beyond the partially closed end 40 of the coil 100.

The coil 100 may be formed from winded multi-strand conductors, also known as Litz wires, and is connected to a power supply by phase connectors outputs 50. The phase connectors outputs 50 extend from the external surface of the head 30. Each phase connector output 50 has its internal conductor 51 separated from the inner surface of the elongated outer wall 30 by at least one electrical conductor 70, so that there is a strictly positive distance and retaining material between the internal diameter ID1 of the head 30 and the phase connector output 50. The same arrangement is implemented to prevent the phase connectors outputs 50 to be located at the outer diameter OD2. This configuration prevents detachment of the phase connector outputs 50 from the coil 100. Such detachments are a well known failure mode of the motor as they result in the phase connector outputs contacting the rotor, and they will be damaged or even cut by the rotor and the motor will break down due to a shorting of the electrical circuit.

Concerning the geometry of the coil 100, the coil body 20 has a thickness e and joins the heads 30, 40 through fillet radius 32, 42, 35, 45. These fillet radiuses are obtained through the bending of the electrical conductors. The external fillet radiuses 37, 38 are obtained by the cross section of the electrical conductors, and since they are multi-stranded, this cross section may be deformed during the forming of the coil 100 so that small radiuses are obtained. Concerning the radiuses 32, 45, similar cross section deformation may also occur. The heads 30, 40 have a radial thickness At. The coil 100, with the use of the multi-strand conductor and its function to be able to bend and to deform, provides a reduction of the axial thickness At of the heads 30, 40 with a bending arrangement of the multi-strand conductor. It is possible with a multi-strand conductor to achieve such bending arrangement because the individual strands have a lower diameter than the equivalent mono-strand conductor and due to the associated lower maximum distance to the neutral axis of each individual strand, the multi-strand conductor is able to be bended without any rupture or cracks that would compromise the electrical continuity of the motor. An increase of the conductor filling factor is also achievable. The conductor filling factor is the ratio of electrical conductor volume to the total volume of the coil 100. This conductor filling factor may be increased by the ability of the litz wire to be deformed by pressure. Under pressure conditions applied during the manufacturing process (by forming dies for example), the cross section of the litz wire may be deformed so that the conductors therein occupy the free space situated between themselves and the total volume of the coil 100 may be reduced.

FIG. 2 represents an axial coil intended for use in a slotless direct current motor. General description from FIG. 1 may be the same. In some implementations, the coil 100 is linked to a rotation axis 200 and the phase connectors outputs 50 are located on the inwardly extending head 40. Each internal conductor 51 of each phase connector output 50 is separated from the external diameter OD2 by at least an internal electrical conductor 70 so that each phase connector output 50 is prevented from detachment that would lead to a motor failure.

A number of implementations have been described. Nevertheless, it will be understood that various modifications may be made without departing from the spirit and scope of the disclosure. Accordingly, other implementations are within the scope of the following claims.

What is claimed is:

1. A coil for a slotless rotating electric motor comprising a plurality of loops of conductor of multi-stranded wire construction positioned in a generally circular pattern and pressed together to form a generally cylindrical body, a first generally annular head at a first axial end of the cylindrical body projecting radially outwardly beyond the cylindrical body, and at a second generally annular head a second axial end of the cylindrical body projecting radially inwardly beyond the cylindrical body, with the coil being free of any frame structure for supporting the loops of conductors in the coil once formed;

with the loops of conductor comprising generally straight central portions that extend along lines that are generally parallel to, but spaced apart from, a longitudinal central axis of the cylindrical body to define a central opening adapted to receive a rotor of a motor for rotation within the coil about the longitudinal central axis;

with the loops of conductor further comprising first axial end portions adjacent the first axial end of the coil that extend generally radially outwardly from the longitudinal central axis to form the first generally annular head;

with the loops of conductor further comprising second axial end portions adjacent the second axial end of the coil that extend generally radially inwardly toward, but stopping short of, the longitudinal central axis to form the second generally annular head with an opening therein around the longitudinal central axis; and a plurality of connector output leads to the loops of conductor, with the leads projecting from one of the heads of the coil.

2. The coil of claim 1, wherein the plurality of connector output leads project from an axial end surface of the respective head of the coil.

3. The coil of claim 2, wherein the plurality of connector output leads project from the first annular head and intersect the first annular head at points spaced outwardly from an inner cylindrical surface of the coil body by a distance equal to or greater than the cross-sectional thickness of the conductor.

4. The coil of claim 2, wherein the plurality of connector output leads project from the second annular head and intersect the second annular head at points spaced inwardly from an outer cylindrical surface of the coil body by a distance equal to or greater than the cross-sectional thickness of the conductor.

5. The coil of claim 1, wherein the cylindrical body of the coil is of a generally uniform radial thickness along its length, wherein the coil has a number of electrical poles, and wherein the first head is of an axial thickness less than 6 times the radial thickness of the cylindrical body divided by the number of poles of the coil.

6. The coil of claim 5, wherein the first head is of an axial thickness less than 4.8 times the radial thickness of the cylindrical body divided by the number of poles of the coil.

7. The coil of claim 1, wherein the cylindrical body of the coil is of a generally uniform radial thickness along its length, wherein the coil has a number of electrical poles, and wherein the second head is of an axial thickness less than 6 times the radial thickness of the cylindrical body divided by the number of poles of the coil.

8. The coil of claim 1, wherein the second head is of an axial thickness less than 4.8 times the radial thickness of the cylindrical body divided by the number of poles of the coil.

9. The coil of claim 1, wherein the central portions of the loops of conductor extend along lines angled less than 30° relative to the longitudinal central axis of the coil.

10. The coil of claim 9, wherein the central portions of the loops of conductor extend along lines angled less than 20° relative to the longitudinal central axis of the coil.

11. A slotless electric motor comprising a coil having a plurality of loops of conductor of multi-stranded wire construction positioned in a generally circular pattern and pressed together to form a generally cylindrical body, a first generally annular head at a first axial end of the cylindrical body and projecting radially beyond the cylindrical body, and at a second generally annular head a second axial end of the cylindrical body and projecting radially beyond the cylindrical body, with the coil being free of any frame structure for supporting the loops of conductors in the coil once formed;

with the loops of conductor comprising generally straight central portions that extend along lines that are generally parallel to, but spaced apart from, a longitudinal central axis of the cylindrical body to define a central opening adapted to receive a rotor of the motor for rotation within the coil about the longitudinal central axis;

with the loops of conductor further comprising first axial end portions adjacent the first axial end of the coil that extend generally radially outwardly from the longitudinal central axis to form the first generally annular head;

with the loops of conductor further comprising second axial end portions adjacent the second axial end of the coil that extend generally radially inwardly toward, but stopping short of, the longitudinal central axis to form the second generally head with an opening therein around the longitudinal central axis; and a plurality of connector output leads to the loops of conductor, with the leads projecting from one of the heads of the coil.

12. The motor of claim 11, wherein the plurality of connector output leads project from an axial end surface of the respective head of the coil.

13. The motor of claim 12, wherein the plurality of connector output leads project from the first annular head and intersect the first annular head at points spaced outwardly from an inner cylindrical surface of the coil body by a distance equal to or greater than the cross-sectional thickness of the conductor.

14. The motor of claim 12, wherein the plurality of connector output leads project from the second annular head and intersect the second annular head at points spaced inwardly from an outer cylindrical surface of the coil body by a distance equal to or greater than the cross-sectional thickness of the conductor.

15. The motor of claim 11, wherein the cylindrical body of the coil is of a generally uniform radial thickness along its length, wherein the coil has a number of electrical poles, and wherein the first head is of an axial thickness less than 6 times the radial thickness of the cylindrical body divided by the number of poles of the coil.

16. The motor of claim 15, wherein the first head is of an axial thickness less than 4.8 times the radial thickness of the cylindrical body divided by the number of poles of the coil.

17. The motor of claim 11, wherein the cylindrical body of the coil is of a generally uniform radial thickness along its length, wherein the coil has a number of electrical poles, and wherein the second head is of an axial thickness equal than 6 times the radial thickness of the cylindrical body divided by the number of poles of the coil.

18. The motor of claim 17, wherein the second head is of an axial thickness less than 4.8 times the radial thickness of the cylindrical body divided by the number of poles of the coil.

19. The motor of claim 11, wherein the central portions of the loops of conductor extend along lines angled less than 30° relative to the longitudinal central axis of the coil.

20. The motor of claim 19, wherein the central portions of the loops of conductor extend along lines angled less than 20° relative to the longitudinal central axis of the coil.

* * * * *

UNITED STATES PATENT AND TRADEMARK OFFICE
CERTIFICATE OF CORRECTION

| | |
|---|---|
| PATENT NO. | : 8,847,459 B2 |
| APPLICATION NO. | : 13/242243 |
| DATED | : September 30, 2014 |
| INVENTOR(S) | : Julien Baudey et al. |

It is certified that error appears in the above-identified patent and that said Letters Patent is hereby corrected as shown below:

In The Claims

At column 8, claim number 8, line number 45 should read "The coil of claim 7".

At column 10, claim number 17, line number 16 should read "wherein the second head is of an axial thickness less than 6".

Signed and Sealed this
Tenth Day of February, 2015

Michelle K. Lee
*Deputy Director of the United States Patent and Trademark Office*